United States Patent [19]

Pugsley

[11] Patent Number: 4,532,596
[45] Date of Patent: Jul. 30, 1985

[54] CONTROLLING REGISTER IN A PRINTING PRESS

[75] Inventor: Peter C. Pugsley, Pinner, United Kingdom

[73] Assignee: Crosfield Electronics Limited, London, England

[21] Appl. No.: 437,049

[22] Filed: Oct. 27, 1982

[30] Foreign Application Priority Data

Oct. 30, 1981 [GB] United Kingdom ................ 8132809

[51] Int. Cl.³ .............................................. B65H 23/04
[52] U.S. Cl. .................................... 364/469; 101/181; 226/3; 226/27; 364/519
[58] Field of Search ............................. 382/48, 59, 61; 364/167, 182, 519, 469; 101/181; 226/2, 3, 27, 28

[56] References Cited

U.S. PATENT DOCUMENTS 3,701,464 10/1972 Crum ............................... 101/181 X
4,428,287 1/1984 Greiner ........................... 364/519 X

FOREIGN PATENT DOCUMENTS 57-93154 6/1982 Japan ................................... 101/181

Primary Examiner—Errol A. Krass
Assistant Examiner—Edward R. Cosimano
Attorney, Agent, or Firm—Sughrue, Mion, Zinn, Macpeak and Seas

[57] ABSTRACT

For register control when printing on a web, signals corresponding to a predetermined hidden pattern of low-amplitude density variations are superimposed on picture signals representing the image to be printed. After printing, light from elements of the printed image, with its hidden pattern, is detected by a register scanning head and the variations are correlated in a signal processor with the known variations of portions of the predetermined hidden pattern. In this way a position error signal is derived and can be used to correct the web position.

6 Claims, 19 Drawing Figures

```
                            RECOGNITION AREA P          REPEAT CELL OF BIT PATTERN
   FOUR SPATIAL NEIGHBOURS OF P
         1  1  0  1  0  0  1  0  1  0  1  1  0  1  0  0
         1  0  1  1  0  1  0  1  0  0  1  0  1  1  0  1
         0  1  0  1  0  1  0  1  0  1  0  1  0  1  0  1
         1  0  1  0  1  0  1  0  1  0  1  0  1  0  1  0
         1  0  0  0  1  1  0  0  1  0  1  0  1  0  1  1
         0  1  0  0  1  0  1  0  1  1  0  1  0  0  1  0
         0  0  1  0  1  0  1  1  0  1  0  0  1  0  1  0
         1  1  0  1  0  0  1  0  1  0  1  1  0  1  0  0
         1  0  1  1  0  1  0  1  0  0  1  0  1  1  0  1
         0  1  0  1  0  1  0  1  0  1  0  1  0  1  0  1
         1  0  1  0  1  0  1  0  1  0  1  0  1  0  1  0
         1  0  1  0  1  1  0  0  1  0  1  0  1  0  1  1
         0  1  0  0  1  0  1  0  1  1  0  1  0  0  1  0
```

FIG.1

| ROW NO. | PATTERN | CORRELATION OUTPUT OF SINGLE-COLUMN HEAD CENTRED ON COLUMN | CORRELATION OUTPUT OF SINGLE COLUMN HEAD STRADDLING TWO COLUMNS WITH RELATIVE PATTERN STAGGER S |
|---|---|---|---|
| | | | S = 1 2 3 4 5 6 7 8 9 10 11 12 13 14 15 |
| 0 | 0 | ⑧ | ④ ④ ③ ③ ④ ④ ④ ④ ④ ④ ④ ③ ③ ④ ④ |
| 1 | 1 | 0 | ④ 0 0 -1 -1 0 0 0 0 0 0 0 -1 -1 0 |
| 2 | 0 | 0 | 0 ④ 0 0 -1 -1 0 0 0 0 0 0 0 -1 -1 |
| 3 | 1 | -2 | -1 -1 ③ -1 -1 -2 -2 -1 -1 -1 -1 -1 -1 -1 -2 |
| 4 | 0 | -2 | -2 -1 -1 ③ -1 -1 -2 -2 -1 -1 -1 -1 -1 -1 -1 |
| 5 | 0 | 0 | -1 -1 0 0 ④ 0 0 -1 -1 0 0 0 0 0 0 |
| 6 | 1 | 0 | 0 -1 -1 0 0 ④ 0 0 -1 -1 0 0 0 0 0 |
| 7 | 1 | 0 | 0 0 -1 -1 0 0 ④ 0 0 -1 -1 0 0 0 0 |
| 8 | 0 | 0 | 0 0 0 -1 -1 0 0 ④ 0 0 -1 -1 0 0 0 |
| 9 | 0 | 0 | 0 0 0 0 -1 -1 0 0 ④ 0 0 -1 -1 0 0 |
| 10 | 0 | 0 | 0 0 0 0 0 -1 -1 0 0 ④ 0 0 -1 -1 0 |
| 11 | 0 | 0 | 0 0 0 0 0 0 -1 -1 0 0 ④ 0 0 -1 -1 |
| 12 | 1 | -2 | -1 -1 -1 -1 -1 -1 -1 -2 -2 -1 -1 ③ -1 -1 -2 |
| 13 | 1 | -2 | -2 -1 -1 -1 -1 -1 -1 -1 -2 -2 -1 -1 ③ -1 -1 |
| 14 | 1 | 0 | -1 -1 0 0 0 0 0 0 0 -1 -1 0 0 ④ 0 |
| 15 | 1 | 0 | 0 -1 -1 0 0 0 0 0 0 0 -1 -1 0 0 ④ |

"WANTED" VALUE 8   4 4 3 3 4 4 4 4 4 4 4 3 3 4 4
(CIRCLED ABOVE)

RANGE OF         0   0 0 0 0 0 0 0 0 0 0 0 0 0 0 0
UNWANTED VALUE TO -2   -2 -1 -1 -1 -1 -2 -2 -2 -2 -2 -1 -1 -1 -1 -2

PREFERRED VALUES OF S ⟶   2   5 6 7   9 10 11   14

FIG. 2

| COLUMN NO. | → | 0 | 1 | 2 | 3 | 4 | 5 | 6 | 7 |
|---|---|---|---|---|---|---|---|---|---|
| STAGGER | → | 0 | 2 | 7 | 13 | 11 | 4 | 15 | 9 |
| RELATIVE STAGGER | → | | 2 | 5 | 6 | 14 | 9 | 11 | 10 | 7 |

ROW NO. ↓

| | 0 | 1 | 2 | 3 | 4 | 5 | 6 | 7 |
|---|---|---|---|---|---|---|---|---|
| 0 | 0 | 1 | 0 | 1 | 0 | 1 | 1 | 1 |
| 1 | 1 | 1 | 0 | 0 | 1 | 1 | 0 | 0 |
| 2 | 0 | 0 | 0 | 0 | 1 | 1 | 1 | 0 |
| 3 | 1 | 1 | 1 | 1 | 0 | 1 | 0 | 0 |
| 4 | 0 | 0 | 1 | 1 | 0 | 0 | 0 | 0 |
| 5 | 0 | 1 | 1 | 0 | 0 | 1 | 1 | 1 |
| 6 | 1 | 0 | 1 | 0 | 0 | 0 | 1 | 1 |
| 7 | 1 | 0 | 0 | 0 | 1 | 1 | 0 | 1 |
| 8 | 0 | 1 | 1 | 0 | 1 | 0 | 0 | 1 |
| 9 | 0 | 1 | 0 | 1 | 1 | 0 | 0 | 0 |
| 10 | 0 | 0 | 1 | 1 | 1 | 1 | 0 | 1 |
| 11 | 0 | 0 | 0 | 1 | 0 | 1 | 1 | 0 |
| 12 | 1 | 0 | 0 | 1 | 1 | 0 | 1 | 1 |
| 13 | 1 | 0 | 1 | 0 | 0 | 0 | 1 | 0 |
| 14 | 1 | 1 | 1 | 1 | 1 | 0 | 1 | 0 |
| 15 | 1 | 1 | 0 | 0 | 0 | 0 | 0 | 1 |

FIG. 3

| POSITION OF 1ST ELEMENT OF HEAD ON PATTERN | → | COLUMN NO. |

| ROW NO. | 0 | 1 | 2 | 3 | 4 | 5 | 6 | 7 | |
|---|---|---|---|---|---|---|---|---|---|
| 0  | [8] | 0 | 0 | -2 | 0 | -2 | 0 | 0 | |
| 1  | 0 | 0 | 0 | -2 | 0 | -2 | 0 | 0 | |
| 2  | 0 | [8] | 0 | 0 | 0 | 0 | -2 | 0 | |
| 3  | -2 | 0 | -2 | 0 | 0 | 0 | -2 | 0 | |
| 4  | -2 | 0 | -2 | 0 | 0 | [8] | 0 | 0 | |
| 5  | 0 | -2 | 0 | 0 | 0 | 0 | 0 | -2 | |
| 6  | 0 | -2 | 0 | 0 | 0 | 0 | 0 | -2 | HEAD CENTRALLY |
| 7  | 0 | 0 | [8] | 0 | -2 | -2 | 0 | 0 | OVER COLUMNS |
| 8  | 0 | 0 | 0 | 0 | -2 | -2 | 0 | 0 | |
| 9  | 0 | 0 | 0 | -2 | 0 | 0 | 0 | [8] | |
| 10 | 0 | 0 | -2 | -2 | 0 | 0 | 0 | 0 | |
| 11 | 0 | 0 | -2 | 0 | [8] | 0 | -2 | 0 | |
| 12 | -2 | 0 | 0 | 0 | 0 | 0 | -2 | -2 | |
| 13 | -2 | 0 | 0 | [8] | 0 | 0 | 0 | -2 | |
| 14 | 0 | -2 | 0 | 0 | -2 | 0 | 0 | 0 | |
| 15 | 0 | -2 | 0 | 0 | -2 | 0 | [8] | 0 | |

FIG.4

| ROW NO. | 0 | 1 | 2 | 3 | 4 | 5 | 6 | 7 | |
|---|---|---|---|---|---|---|---|---|---|
| 0  | [4] | 0 | -1 | -1 | -1 | -1 | 0 | [4] | |
| 1  | 0 | 0 | -1 | -1 | -1 | -1 | 0 | 0 | |
| 2  | [4] | [4] | 0 | 0 | 0 | -1 | -1 | 0 | |
| 3  | -1 | -1 | -1 | 0 | 0 | -1 | -1 | -1 | |
| 4  | -1 | -1 | -1 | 0 | [4] | [4] | 0 | -1 | |
| 5  | -1 | -1 | 0 | 0 | 0 | 0 | -1 | -1 | |
| 6  | -1 | -1 | 0 | 0 | 0 | 0 | -1 | -1 | |
| 7  | 0 | [4] | [4] | -1 | -2 | -1 | 0 | 0 | HEAD STRADDLING |
| 8  | 0 | 0 | 0 | -1 | -2 | -1 | 0 | 0 | ADJOINING COLUMNS |
| 9  | 0 | 0 | -1 | -1 | 0 | 0 | [4] | [4] | |
| 10 | 0 | -1 | -2 | -1 | 0 | 0 | 0 | 0 | |
| 11 | 0 | -1 | -1 | [4] | [4] | -1 | -1 | 0 | |
| 12 | -1 | 0 | 0 | 0 | 0 | -1 | -2 | -2 | |
| 13 | -1 | 0 | [4] | [4] | 0 | 0 | -1 | -2 | |
| 14 | -1 | 1 | 0 | -1 | -1 | 0 | 0 | 0 | |
| 15 | -1 | -1 | 0 | -1 | -1 | [4] | [4] | 0 | |

FIG.11

| B LAG ↓ \ A LAG → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | | | 11 3 | | | 15 5 | 9 6 | 4 4 | | 0 7 | 13 2 | 7 1 | | | 2 0 | |
| 1 | | | | 10 3 | | | 14 5 | 8 6 | 3 4 | | 15 7 | 12 2 | 6 1 | | | 1 0 |
| 2 | 0 0 | | | | 9 3 | | | 13 5 | 7 6 | 2 4 | | 14 7 | 11 2 | 5 1 | | |
| 3 | | 15 0 | | | | 8 3 | | | 12 5 | 6 6 | 1 4 | | 13 7 | 10 2 | 4 1 | |
| 4 | | | 14 0 | | | | 7 3 | | | 11 5 | 5 6 | 0 4 | | 12 7 | 9 2 | 3 1 |
| 5 | 2 1 | | | 13 0 | | | | 6 3 | | | 10 5 | 4 6 | 15 4 | | 11 7 | 8 2 |
| 6 | 7 2 | 1 1 | | | 12 0 | | | | 5 3 | | | 9 5 | 3 6 | 14 4 | | 10 7 |
| 7 | 9 -7 | 6 2 | 0 1 | | | 11 0 | | | | 4 3 | | | 8 5 | 2 6 | 13 4 | |
| 8 | | 8 7 | 5 2 | 15 1 | | | 10 0 | | | | 3 3 | | | 7 5 | 1 6 | 12 4 |
| 9 | 11 4 | | 7 7 | 4 2 | 14 1 | | | 9 0 | | | | 2 3 | | | 6 5 | 0 6 |
| 10 | 15 6 | 10 4 | | 6 7 | 3 2 | 13 1 | | | 8 0 | | | | 1 3 | | | 5 5 |
| 11 | 4 5 | 14 6 | 9 4 | | 5 7 | 2 2 | 12 1 | | | 7 0 | | | | 0 3 | | |
| 12 | | 3 5 | 13 6 | 8 4 | | 4 7 | 1 2 | 11 1 | | | 6 0 | | | | 15 3 | |
| 13 | | | 2 5 | 12 6 | 7 4 | | 3 7 | 0 2 | 10 1 | | | 5 0 | | | | 14 3 |
| 14 | 13 3 | | | 1 5 | 11 6 | 6 4 | | 2 7 | 15 2 | 9 1 | | | 4 0 | | | |
| 15 | | 12 3 | | | 0 5 | 10 6 | 5 4 | | 1 7 | 14 2 | 8 1 | | | 3 0 | | |

CONTROLLING REGISTER IN A PRINTING PRESS

BACKGROUND OF THE INVENTION

This invention relates to a method and apparatus for controlling the register of a printing operation and at least one other operation performed on a web, and especially the register of colour separations printed on to a web, using a special pattern printed on the web.

The register of colour printing operations performed at different stations on a moving web has been controlled in the past by printing special register control marks either in a column at one edge of the web or else in gaps between the printed images. Where register control marks were printed in a column on one side of the web, generally to one side of each colour image, there was a significant wastage of space on the web. For adequate register control, it was necessary to provide substantial gaps between the colour images on the web when register control marks were printed in the regions between the colour images. A further disadvantage of known methods of register control is that the accuracy is limited by the stretching of the web between the region on which the colour image is printed and the region on which are printed the corresponding register control marks.

SUMMARY OF THE INVENTION

It is an object of the present invention to provide a method of press register control using a special pattern printed on the web which avoids the wastage of areas on the web inherent in previous methods, and which has a greater accuracy than before.

The principle behind the invention is that a predetermined pattern of low-amplitude density variations is superimposed on the or each separation image, so that any register error in the resulting printed separations can be detected by recognising part of the pattern on each printed separation and matching it with the original predetermined pattern. This invention therefore avoids the need for printing special register marks in regions outside the colour separations.

A method according to the invention of controlling the register of a printing operation with at least another operation performed on a web at respective stations, comprises the steps of: providing picture signals corresponding to an image to be reproduced on which is superimposed a hidden, irregular pattern which is repeated many times over the image area; printing the web from a plate or cylinder produced under the control of the picture signal; monitoring the relative positions of the printed image on the web and the other operation performed on the web by detecting light derived from a portion of the printed image on the web surface, and correlating the variations of light intensity within that portion with the variations of regions of the predetermined pattern, and thus deriving a position signal indicative of the displacement of the web from a reference position established by the position of the detector; and maintaining the correct register and alignment, in one or more directions, of the operations by making adjustments at a station in accordance with the position signal. The said other operations may include a web cutting or folding operation, or a further printing operation; the printing may be in black-and-white, with just one image to be printed, or in colour, with two or more image separations. Preferably the picture signal is derived from an original image and modulated electronically with a predetermined irregular pattern signal.

The register control method preferably includes two modes of operation, the first mode being an acquisition mode wherein the variations of light intensity within the detected portion are compared with the variations of regions of the predetermined pattern equal in size to the said portion, the correlation being performed for every possible position of the portion within the predetermined pattern so as to obtain the best match; and a tracking mode wherein correct register or alignment is maintained by correlating the said portion with the region which provided the best match during the acquisition mode together with only the nearest regions in the predetermined pattern surrounding that region of best match. The acquisition mode is generally slower than the subsequent tracking mode, and in practice the best match will be found only after one or two press revolutions.

BRIEF DESCRIPTION OF THE DRAWINGS

In order that the invention may be better understood, the principle behind the invention is described further below together with a description of several preferred embodiments of the invention, with reference to the accompanying drawings, wherein:

FIG. 1 is an example of a pseudo-random bit pattern to be superimposed on an original image;

FIG. 2 shows the correlation output from the single-column head of FIG. 1a when the head straddles two vertical columns, the vertical columns having a relative pattern stagger;

FIG. 3 shows a 16×8 bit pattern assembled from a single 16-bit sequence staggered vertically;

FIG. 4 shows the correlation output obtained using the pattern of FIG. 3, when the detector head is placed centrally over the columns of the pattern or when it straddles pairs of adjacent columns;

FIG. 5b is an end elevation of the detector head of FIG. 5a;

FIG. 11 shows a ROM decoder truth table for deriving the coarse vertical and horizontal positions;

FIG. 12a shows an additional logic function for deriving the fine vertical position;

FIG. 12b is a table showing the logic function of FIG. 12a;

DETAILED DESCRIPTION OF THE PREFERRED EMBODIMENTS

Figure 1A:
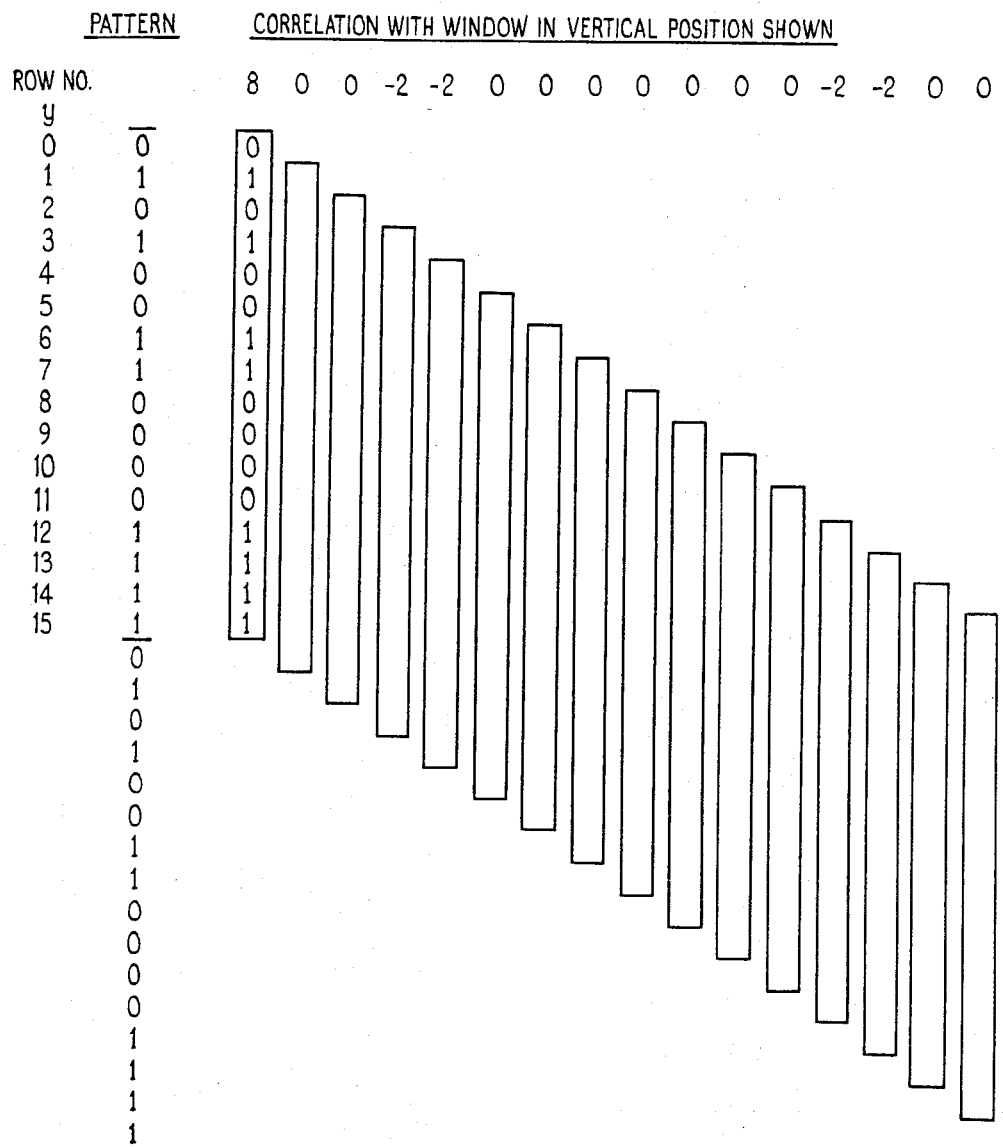
FIG. 1a shows the correlation output from a single-colour detector head during vertical scanning of a column.

The general principle behind the preferred form of the invention is that a two-dimensional pseudo-random binary pattern of low amplitude density variations is superimposed on each colour separation image, in such a form that the pattern is invisible but can nevertheless be detected by register control apparatus. The pattern may be different for each colour, or else one pattern may be used for yellow, magenta and cyan colours, the signals being separated by colour filters, and a second pattern used for black. The pattern is hidden by choosing a suitable size and amplitude for the pattern. For half-tone printing in which the tone gradation is achieved by a variation in the size of printed dots having equidistant centres, the pattern is applied as an additive modulation of percentage dot values (the percentage of the maximum dot area), either by the use of a special contact screen or mask, or else by adding an electronic pattern signal in the process of scanning the original image. On each colour printing press, a suitable track along the web is monitored by a scanning head. The position of the binary pattern in each colour is detected by the correlation of the scanning head signal with the expected pattern signal. Relative position signals derived from this correlation are then used to control press register for the relevant colour. Both longitudinal and transverse positions of the web can be detected and controlled. A suitable binary pattern for superimposition on the original image consists of a two-dimensional array of zeros and ones, the whole array being repeated so as to cover the whole image area.

Assume that the size of the array is $m \times n$ bits. Assume also that the area of the window sensed by the scanning head for correlation has a size $m' \times n'$ bits. The desirable properties of the array are then that:

1. Every one of the $m \times n$ sub-arrays formed by placing an $m' \times n'$ window on the original array and its adjoining repeats is distinguishable, the differences between them being maximised to aid the distinction of the best match from the adjoining sub-arrays.

2. Small areas of the array should contain approximately equal numbers of zeros and ones, to minimise the visibility of the pattern.

3. Adjacent rows or columns should not contain substantially different numbers of zeros or ones, to minimise visibility of row or column lines.

An example of a suitable pattern is illustrated in FIG. 1. The scanning head in this example consists of a single column, so that in this example $n=7$, $m=10$, $n'=7$, and $m'=1$. A single column scanning head ($m'=1$) is desirable in practice for simplicity. It facilitates the use, for example, of an optical fibre scanning head. The pattern of FIG. 1 shows a repeated cell consisting of an $n \times m$ bit array in rectangular form which is repeated throughout the image area, of which only a portion is shown in FIG. 1. The single column scanning head scans over a recognition area P, and the variations within this recognition area are correlated with areas of corresponding size of the pattern of FIG. 1. The number of distinct positions for the recognition area is equal to $n \times m$, i.e. 70. Since the pattern repeats after 10 bits horizontally and 7 bits vertically, unambiguous error information, relating to the displacement of the recognition area from its expected position, is available only for displacement up to a little less than half this distance, i.e. ±4 bits horizontally and ±3 bits vertically.

For the perfect correlation of the picture signal derived from the printed web with the expected pattern, it would be necessary to isolate the modulation components from the picture signal components. This is not possible in practice, but various methods are suitable for reducing the interference of the original, unmodulated picture signal with the register control process. On analysis of the correlation process, it is found that the detection of the pattern in the presence of large-amplitude random picture signals is difficult and requires correlation over an impractically large window for reliable operation. Detection can be improved by:

(a) utilising the statistical properties of real images. It is known that real images have relatively little energy at high spatial frequencies, so that provided the pattern is designed to have minimum low frequency content (desirable anyway as implied by the requirement 2 above), high-pass filtering of the scan head signal removes much of the image while retaining the pattern.

(b) limiting any remaining noise spikes arising from high-contrast image detail, to further reduce noise in the desired signal while only slightly impairing the wanted pattern.

(c) providing a suitable detecting system (see below) so that the correlation is attempted only in areas of the image which contain suitable densities of half-tone images.

The scanning head may pass across white paper and text, black and white half-tone images, or colour half-tone images. The last is useful for register detection, and only an area of the colour image in which the density in one colour lies between about 10% and 90% dot size, can reliably be used. If the density lay outside these limits, the image signal may fail to be effectively modulated, and the overall image signal may reveal an undesirable visible pattern because the apparent density of half-tone images changes rapidly in half-tone density ranges outside these limits. It is therefore an advantage to provide a detector that responds to the desired range of dot size, and to inhibit correlation outside this range. Detection is more easily performed if a separate sensor with a colour filter is provided for each colour. Black ink cannot be distinguished from colours by a filter, but may be assumed to be present whenever the three colour-filter signals are simultaneously within a suitable range, typically corresponding to about 30% to 90% dot.

The most reliable indication of the relative position of the recognition area P within the overall pattern would be obtained by correlating the detected pattern with all distinct regions of the overall pattern, the distinct regions having the same size as the recognition area P. However, each correlation operation involves several mathematical operations, and if it were to be repeated $m \times n$ times a very large computer would be required to perform this operation within the time taken for a printing cylinder to rotate through one revolution, for example. It is preferable to optimise the practical performance of register control apparatus embodying this invention by means of mode-switching. There are preferably two distinct operating modes: an acquisition mode which may proceed off-line at start-up, during which the error in alignment and/or register is detected; and a tracking mode which, once the pattern position has been determined during the acquisition mode, provides close alignment and/or register control. The main difference between these modes of operation is in the number of correlations performed.

Images (with their hidden patterns) may be located at random on the pages printed on the web. The printing press is assumed to run up in approximate register (with some specifiable limits), and it is assumed that some time delay (e.g. a few press revolutions) is acceptable between the production of the first scannable images and the start of register correction in acquisition mode. In the acquisition mode, the system determines reliably the position of the hidden pattern ab initio. For this purpose, it is advantageous to make the sensing window or recognition area P, within which correlation is determined, as large as possible. Since the pattern position is unknown, correlation must be calculated for all the $m \times n$ possible positions of the pattern within the overall pattern.

Once the pattern position has been determined during the acquisition mode, the tracking mode can be entered. The tracking mode can provide close register control rapidly. The register error resulting from changes from one revolution of the printing cylinder to the next is very small in comparison to the possible register errors at start-up. For this reason, it is only necessary to correlate the pattern of the recognition area P with its expected region of the pattern and a few neighbouring regions of equal size. Because only a few correlation operations need be performed for each revolution, the necessary speed of operation does not prohibit the use of a comparatively small computer operating on-line. As shown in FIG. 1, if for example the "best match" of the detected area with the overall pattern occurs for a recognition area P shown in heavy outline, then during tracking mode the correlation need be carried out only with that recognition area P and its four nearest neighbours, shown in dotted lines. If it were subsequently found during one revolution that one of the spatial nearest neighbours of P provided a better correlation than did the recognition area P, a position signal could be provided indicating a required register or alignment correction so as to shift the printed pattern. During the tracking mode, the central pattern for correlation is always that which has given the highest correlation during the previous set of calculations. Since correlation in the tracking mode is calculated only for the recognition area P and its spatial neighbours it is of advantage to design the overall $m \times n$ pattern array so that adjacent or nearly adjacent subarrays selected for sensing differ from one another by the greatest possible number of digits. This improves noise discrimination, i.e. discrimination between the modulation signal and the unwanted picture signal, and enables the correct recognition in tracking mode with the smallest number of correlating points. The correlation during tracking mode may be calculated on a smaller window than is commonly used during the acquisition mode.

A numerical analysis of the correlation method reveals that for adequate discrimination of a picture signal with about 2% modulation with a binary pattern, it is necessary to scan about 1000 elements of the array for acquisition mode, which is about 14 repeats of the $10 \times 7$ bit array. Each correlation calculation requires about 1000 additions or subtractions, and the correlation must be attempted on each position of the array i.e. 70 times, so that the total number of additions or subtractions is equal to $70 \times 1000$ or 70,000. For adequate operation of the method during tracking mode, if the detected recognition area is a column of height $n'$, then, depending on the pattern, $n'$ should be of the order of 50 to 100.

Two practical correlation systems will now be described, namely
  a digital electronic system, and an optical correlation system.

Figure 4A:
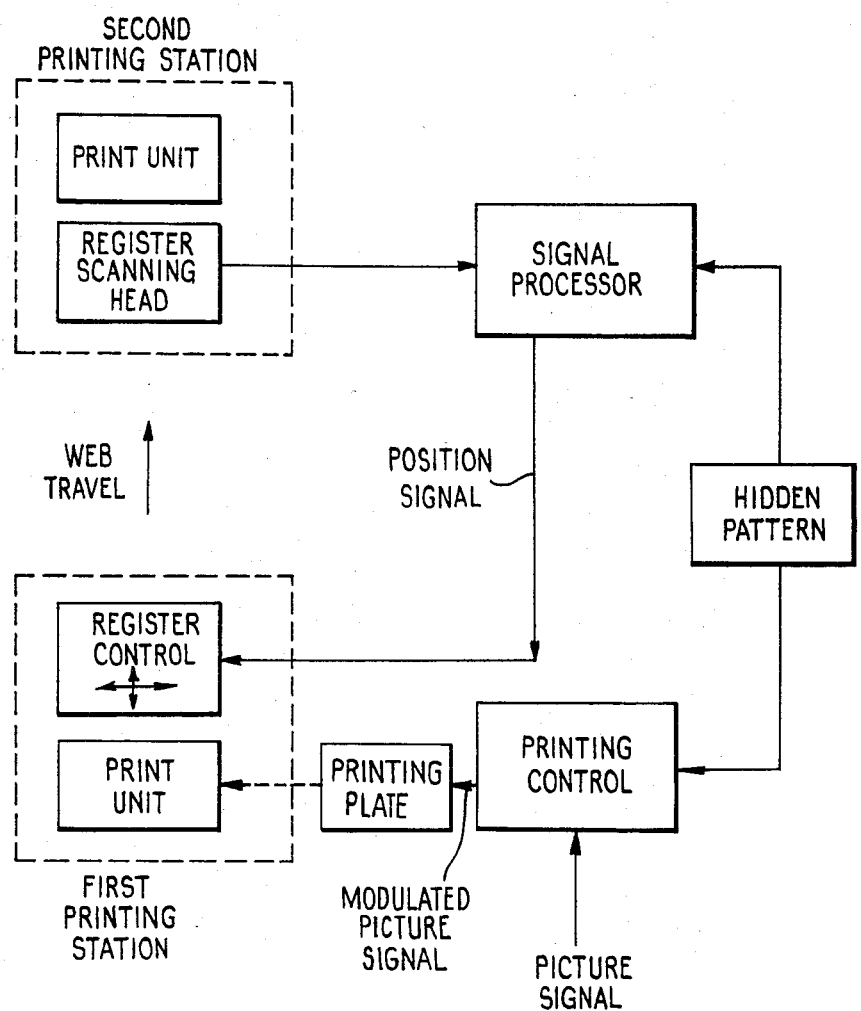
FIG. 4a is a schematic diagram showing apparatus embodying the invention, with two printing stations and register control apparatus.

Either of these systems can form a part of the overall register control apparatus, of which a simple example is illustrated schematically in FIG. 4a. A web travels past first and second printing stations, and a register scanning head at the second station scans a printed image and provides output signals, indicating the amplitude of the image, to a signal processor programmed with the "hidden pattern" information. This pattern information is the same as that which has been used to modulate the picture signal supplied to a printing control unit to produce a printing plate for the first print unit. The signal processor outputs position signals indicating the relative position of the printed image and the scanning head, hence the register error between the two stations, and a register control unit makes corresponding adjustments. Any established method of register adjustment can be used. Adjustments can be made actually at the print unit, or in the web path between the first and second print units.

In a digital electronic system, the scanning head comprises one or more sensors, spaced across the web at a pitch corresponding to the pattern element size. Each sensor responds to an area approximately equal to that of a pattern element. This also generally corresponds to the area of a picture element of the half-tone picture signal.

The output of each sensor of the scanning head is processed by a simple high-pass filter and limit circuit to reduce interference from the original picture. Clock pulses are provided at a rate corresponding to the passage of pattern elements under the scan head. Each clock triggers the operation of an analogue-to-digital converter connected to the filtered output of each sensor, causing a digital signal representing the instantaneous value of the filter output to be produced.

In an alternative arrangement, digital high-pass filtering is performed after the analogue-to-digital converter; this has the advantage that the filter cutoff frequency may be made a function of the clock pulse frequency and hence of the press speed. Moreover, with proper design of the pattern so that the zeros and ones are uniformly mixed, the correlation process itself will eliminate sensitivity to low frequency components in the modulated picture signal, and explicit filtering may be omitted.

During the acquisition mode, the digitised signals may be stored; in the tracking mode the computations must proceed on-line. In either case, a train of control signals is generated by the interrogation of a read-only store (ROM) containing the expected pattern. The following correlation operation is then carried out:

$$n' \, C_p = \sum_1^{n'} P_j x_j$$

where $x_j$ = current signal from scan head $P_j = +1$ or $-1$, according as the jth element in the current 'window' in the ROM is 1 or 0

During acquisition mode, the correlation summation is carried out either sequentially or semisequentially for all the m×n windows in the ROM pattern. In the tracking mode, the summation is carried out in parallel for the current five windows in the ROM pattern. In either case, the summation resulting in the greatest correlation coefficient $C_p$ indicates the window position nearest the actual current position of the web, and the exact position may be inferred by a process of interpolation between the windows giving the highest correlation coefficient $C_p$. Linear interpolation may be used for this purpose, to provide a fine adjustment of alignment or register.

The number of windows used during the tracking mode need not be the recognition area P and its four nearest neighbours, i.e. a total of five windows, but a greater or smaller number may be used; a greater number permits a more reliable interpolation and tracking.

An optical correlation system preferably employs a single optical fibre or fibre bundle and a single detector, the motion of the web causing vertical scanning of the detector along a column, and timewise variations in the detector output being processed electronically in a known manner, for example using shift registers, to derive a column matrix of binary values. These variations are processed electronically to derive correlation signals for each colour, in accordance with the correlation between the detected and expected vertical column pattern.

Alternatively, the system employs a single column detecting head comprising two sensors, each sensor coupled to the same region of the web by an optical system, for example specially routed optical fibres or fibre bundles, so as to receive light from a number of discrete areas within that region of the web corresponding to specific pattern elements. In the pattern shown in FIG. 5a for example, photocell R' coupled to fibres x on the left hand side receives light from the elements of the vertical column pattern where a 0 is expected, and photocell R coupled to fibres y on the right hand side receives light from all the elements where a 1 is expected, in the binary sequence "01010011000011111". Photocell sensor R' produces a summed output Ex, and sensor R produces a summed output Ey. The output Ex, for example, is largest when all the optical fibres of the left hand group overlie zeros in the web pattern. The signal Ey is least when all the underlying elements are ones. A correlation signal Cp=Ex−Ey, produced as the web is moved in a vertical direction, is therefore proportional to the degree of correlation between the superimposed pattern on the underlying web and the inherent pattern in the optical fibres comprising the sensors, and has a peak output when coincidence is detected, provided that the horizontal position of the web is also correct.

With regard to the horizontal (transverse) position of the pattern, various methods may be employed to accommodate and measure horizontal (transverse) displacement of the pattern. For this purpose, two or more detectors or scanning heads, each of the single fibre type or of the column type, may be spaced transversely across the web, either spatially separated or interleaved. The minimum number of stationary detectors is two, and these are referred to below (with reference to FIG. 8) as head A and head B, The matching of the superimposed pattern with the expected pattern in the horizontal direction across the web is therefore achieved by determining which of the scanning heads provides the best correlation, i.e. the highest peak value of the correlation signal Cp.

An alternative method is to use a single detector head which is traversed mechanically across the web. It need only be traversed during the acquisition mode. In the tracking mode, to provide error direction sensing, two heads separated in the horizontal direction are used, or else a single head may be used with a superimposed positional dither in the horizontal direction.

At the expense of a more complicated problem in designing an optimum pattern, it is possible as a further option to design a pattern which consists of a mixture or superimposition of two patterns, P and P', each of which is sensed by a pair of multiple sensors, x, y and x', y', as described above with reference to FIG. 5. The patterns may be arranged so that:

(i) P produces a peak output from x, y at the constant vertical position irrespective of the horizontal position, and (ii) P' produces a peak output from x', y' at a point whose vertical displacement from the P output is a function of the horizontal position of the pattern relative to the sensor. It is of course important that the two patterns P, P' do not interfere with each other, and this must be taken into account when designing the patterns. Timing measurements of the two pulses, i.e. the two peak outputs, permit the extraction of complete spatial information in an analogous manner to that in which wedge-shaped register marks are used in known register detection equipment.

Variations in the method described immediately above are possible, in which neither peak output pulse occurs at a constant vertical position irrespective of the horizontal position. The timing of both peak output pulses is then dependent on both the vertical and the horizontal position, and some function (for example mean time) is used to measure the vertical position.

As another possible variation of this method, the two patterns P, P' may be combined in such a way that the sensors for say x and x' are arranged to expect identical pattern cells, and therefore only one of these is required. There are therefore only three sensors in total.

In designing the two patterns described above care is required to avoid any visible horizontal or diagonal structure in the final image. This may be reduced by breaking the pattern up in a random manner while ensuring there is always sufficient of it under the scan head to permit reliable correlation.

An embodiment of the invention will now be described using a single fibre or column type sensing head and a two-dimensional binary hidden pattern. The pattern to be recognized is in the form of a vertical column, which is repeated horizontally but with the columns staggered vertically. The same vertically-repeated pattern therefore appears in all columns across the pattern. To obtain a two-dimensional permanent pattern using the column type of head, it is more practical to use a number of identical column heads, rather than using a number of different heads in which the fibres are routed in a different manner. Each identical one-dimensional head therefore senses a single column of the superimposed pattern, and the pattern itself is so designed that distinctive combinations of outputs from the heads enable all the possible positions of the pattern relative to the heads to be identified uniquely.

For the purpose of this description, it is assumed that it is sufficient to identify 8 distinct columns in the horizontal direction across the web, and 16 positions in the vertical direction (in the direction of web travel). A repeated cell of the pattern therefore consists of 8×16 elements. If the pattern is composed for example of 1 mm² elements, and suitable interpolation is provided for fine adjustment, this provides a practical range of positioning.

Figure 5A:
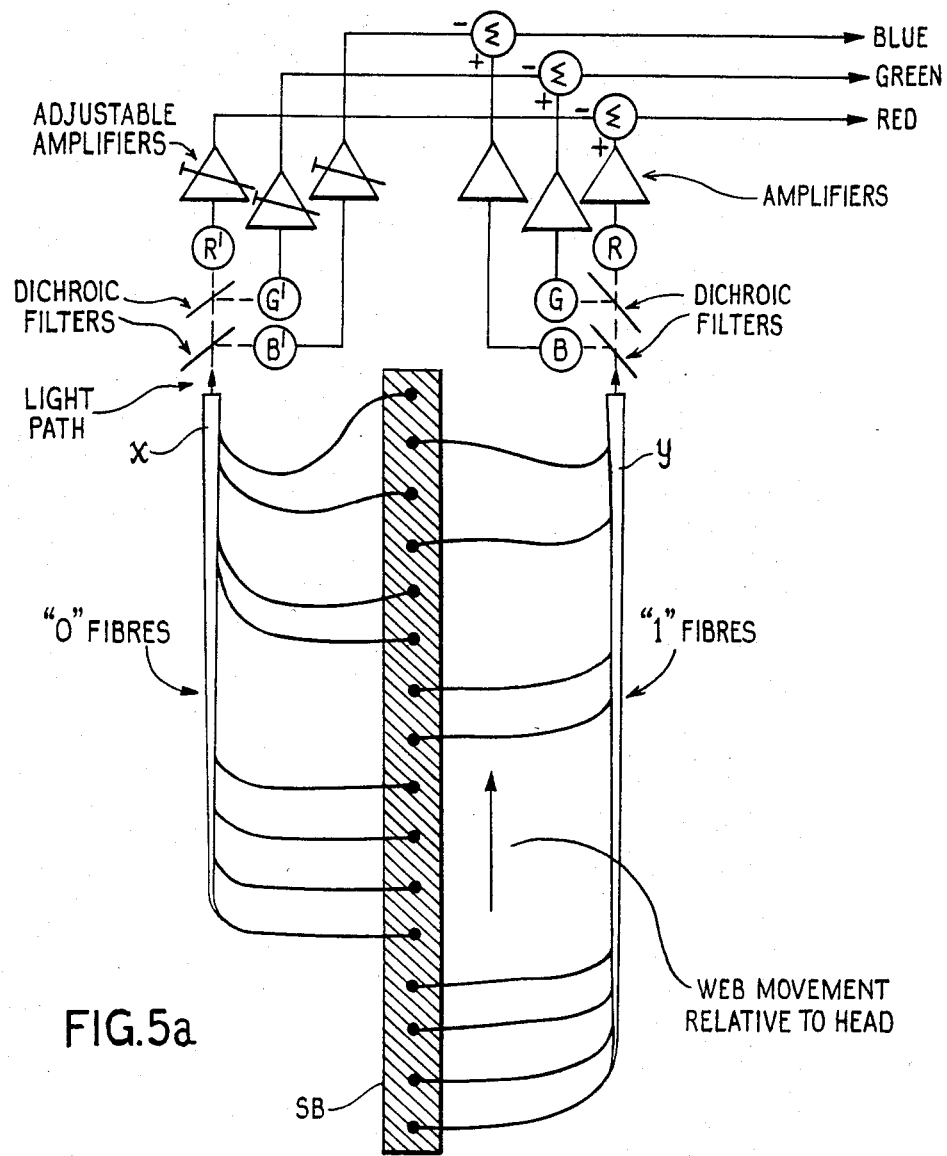
FIG. 5a shows schematically a single-column optical fibre detector head and its associated circuits, for use in apparatus embodying the present invention.

FIG. 1a illustrates the first stage in developing a suitable pattern. A single column sequence of 16 elements, comprising an equal number of zeros and ones, is shown repeated twice on the left. A detector head of the form shown in FIG. 5a is programmed to expect zeros and ones at the 16 positions in a single column of this pattern. The detector head is positioned over a window in the pattern at various vertical positions, the 16 possible vertical positions being shown in staggered relationship in FIG. 1a. The value of the correlation signal Cp corresponding to each vertical position is shown in a horizontal line at the top of FIG. 1a. Where a 0 is expected, and a 0 appears in the sequence on the lefthand side of FIG. 1a, the contribution to the correlation signal from that element is 0. Where a 0 is expected and a 1 appears, the contribution is −1. Where a 1 is expected and a 0 appears, the contribution to the correlation signal is 0; and where a 1 is expected and a 1 appears, the contribution is 1. Therefore, for a perfect match of all 16 elements, as shown in the leftmost of the staggered vertical positions of the detector, a correlation score of 8 is achieved. The pattern sequence has been chosen so as to produce minimum values of the correlation signal at all points other than the position of correct match. Other sequences may also have this property, and it is not claimed that the sequence shown in FIG. 1a is optimised.

The representation of the hidden pattern as a sequence of 0s and 1s is a convenient form for analysis, but it should be understood that it is intended to apply equal positive and negative perturbations to the original print signal, as described above.

The next stage in developing a suitable pattern is shown in FIGS. 2 and 3. A suitable two-dimensional pattern is obtained by placing a number of vertical sequences identical to that shown in FIG. 1a side-by-side, the vertical columns being displaced vertically or staggered relative to each other. This pattern is scanned by two independent scanning heads on adjacent columns, and the relative displacement of the two column patterns may be detected by the relative displacement in time of the peak signals from the two independent scanning heads as the web moves vertically beneath them. This displacement may be detected in the absence of any reference timing source. A complete 16×8 bit pattern is illustrated in FIG. 3, in which the relative stagger between adjacent columns is not constant but varies according to a predetermined horizontal pattern. Each stagger from one vertical column to the next is unique, so this provides a unique indication of the lateral position of the pattern relative to the pair of scanning heads. Having obtained the relative horizontal position, it is possible then to determine the relative vertical position of the pattern, given the timing of the peak signal in any one column, since the vertical stagger of that column is known from the pattern design. The top half of FIG. 4 shows the numerical outputs from the scanning heads corresponding to the correlation signal, when each scanning head is positioned accurately over elements of the superimposed pattern. The peaks in the correlation signal, are shown surrounded by heavy lines.

Before finalising the design for the two-dimensional pattern, it is necessary to consider the possibility that the scanning heads will sometimes straddle adjacent pattern columns, so that each head sees a mixture of the signals derived from two columns of the pattern. The output derived from such a head is shown in FIG. 2. In the top portion of FIG. 2, the same vertical pattern of FIG. 1a is shown against Row Number on the far left of the table. Against this pattern is shown the correlation output of a single-column head centred exactly on the column, corresponding to the leftmost column of the pattern shown in the upper half of FIG. 4. The correlation output of a single-column head straddling two columns with a relative pattern stagger of S is shown for each different possible value of S in the table on the righthand side at the top of FIG. 2. Where, for example, the stagger S is 1, the peak in the correlation output occurs over two adjacent elements in the vertical direction, and the peak value is 4 instead of 8. When S=1 or 15, the correlation pulses from the two patterns half under the head tend to merge in this manner, being separated in time by only one element. It is therefore desirable to avoid this condition, choosing values of S between 2 and 14. Some of the values of S give peak correlation values of 3 instead of 4, and these also are less desirable; the preferred values of S are shown in the bottom row in FIG. 2. In order for the last line of the staggered pattern to match up with the first line with a definite amount of stagger, it is necessary for the eight values of S selected to add up to a multiple of 16. In selecting eight values of S out of the nine possible values that remain, such that their total is a multiple of 16, it is necessary to omit the value 8, leaving 2, 5, 6, 7, 9, 10, 11 and 14, whose total is 64. In the preferred pattern shown in FIG. 3, the values S of the relative stagger in adjacent columns are chosen from this set of values, and each is unique. The sequence in which these staggers are taken is constrained in that, not only the stagger from one column to the next must be considered, e.g. from the fourth to the fifth column (S=14), but also the stagger from the last back to the first (S=7). A reasonably uniform distribution of 0's and 1's over the whole pattern is desirable to reduce its visibility on the finished print. The lower table in FIG. 4 shows the variations in the correlation signal derived from scanning heads which straddle two adjoining columns, and the same constraints and requirements apply to this case.

FIG. 5a, to which reference has already been made, shows the basic construction of a single column scanning head which embodies the binary pattern of FIG. 1a. A bundle x of optical fibres which expect 0's in the superimposed pattern provides light to an optical system comprising red-sensing (R'), green-sensing (G') and blue-sensing (B') photocells. A pair of dichroic filters directs light of the required colour to each of the photocells. The provision of independent photocells together with their respective photocell amplifiers allows each colour to be adjusted for gain balance. The other bundle y of optical fibres which are arranged to expect 1's in the underlying pattern are directed to a similar optical arrangement consisting of two dichroic filters, red, green and blue photocells (R, G and B) and their respective photocell amplifiers. Only one set of photocell amplifiers (those for the 0 fibres, x) need to be adjustable. The outputs from photocell amplifiers of the same colour are subtracted in summing units so as to produce the correlation signal Cp for each respective colour.

Figure 5B:
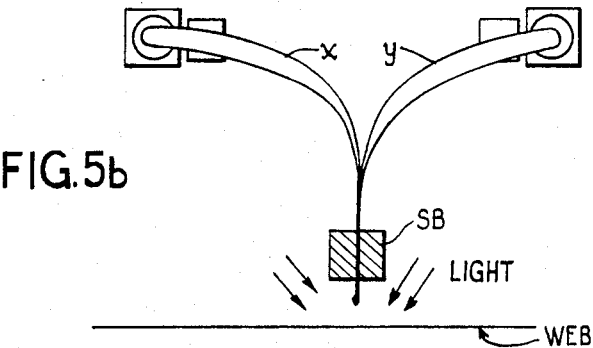

The two optical fibre bundles x, y are interdigitated and are terminated in the same support block SB overlying an illuminated region of the web, as shown in FIG. 5b. The apparatus may be pre-adjusted using the gain adjustment so that the outputs of the two sets of amplifiers are made to balance exactly whenever the reflecting surface under the head is uniform over the whole area of the fibres. Preferably, logarithmic amplifiers are used so that after sign inversion the outputs represent the optical density of the material being scanned, rather than its reflectance. This enables sensitivity to be achieved over a substantial part of the picture range from light to dark. A source of white light is used to illuminate the web in the region underneath the fibres. Depending on the scale selected for the pattern, it may be preferable to use a fibre bundle instead of a single optical fibre to sense each element in the pattern, the bundles being combined into larger bundles before reaching the dichroic filter section. Other variations of this apparatus are envisaged, using for example a lens interposed in the light path between the fibre bundle and the photocells. By using optical fibre systems, the photocells may be placed remotely from the sensing area, allowing two sensing heads to be placed very close together without any interference between their respective photocells.

Figure 6:
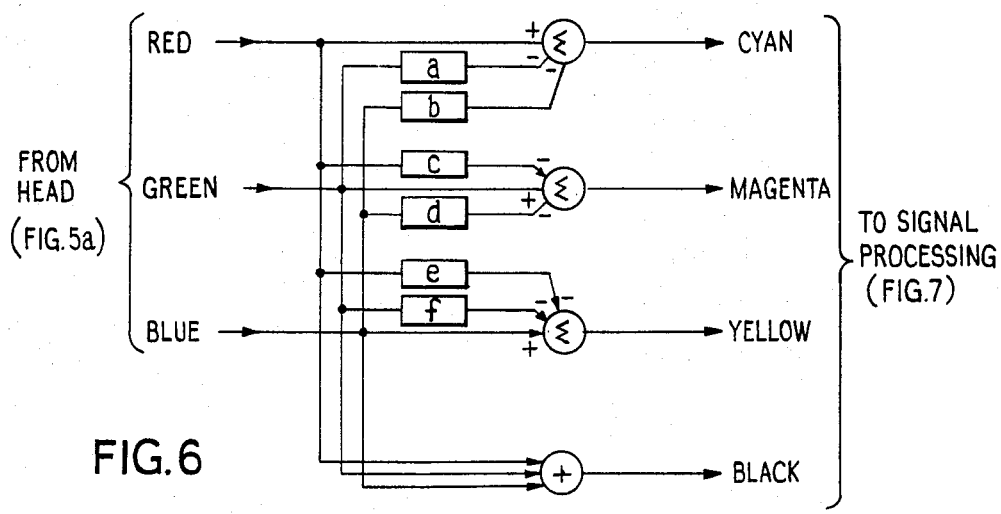
FIG. 6 shows an analogue processing system for treating the detected signals from the detector head of FIGS. 5a and 5b.

FIG. 6 shows the analogous processing of the separate colour signals derived from the scanning head of FIG. 5a. The red, green and blue correlation signals from the scanning heads are combined in predetermined proportions to derive correlation signals for each of the four printing colours: cyan, magenta, yellow and black. Each of the correlation signals derived in the apparatus of FIG. 6 is a combination of each of the three input colour signals in accordance with predetermined proportions. The proportions are controlled by a system of attenuators a, b, c, d, e and f; the contributions are added in summing units. These proportions are set so that the same adjustment serves for a majority of sets of printing ink, and crosstalk between colour channels is minimised.

A difficulty arises in the black signal, since black ink absorbs light of all colours, and therefore generates a strong signal in the cyan, magenta and yellow channels. As shown in FIG. 6, a reasonable representation of black is obtained by taking the sum of the red, green and blue channels, but there is no way of distinguishing between the presence of black ink and the presence of equal amounts of cyan, magenta and yellow ink. A possible solution to this difficulty is the use of a different hidden for black which can be separately detected. The patterns could be composed of a different vertical sequence, in which case separate heads would be required for black, or alternatively, the black pattern could be distinguished by a different combination of vertical staggers; this would probably necessitate a larger pattern repeat than the 16×8 pattern described above.

Figure 7:
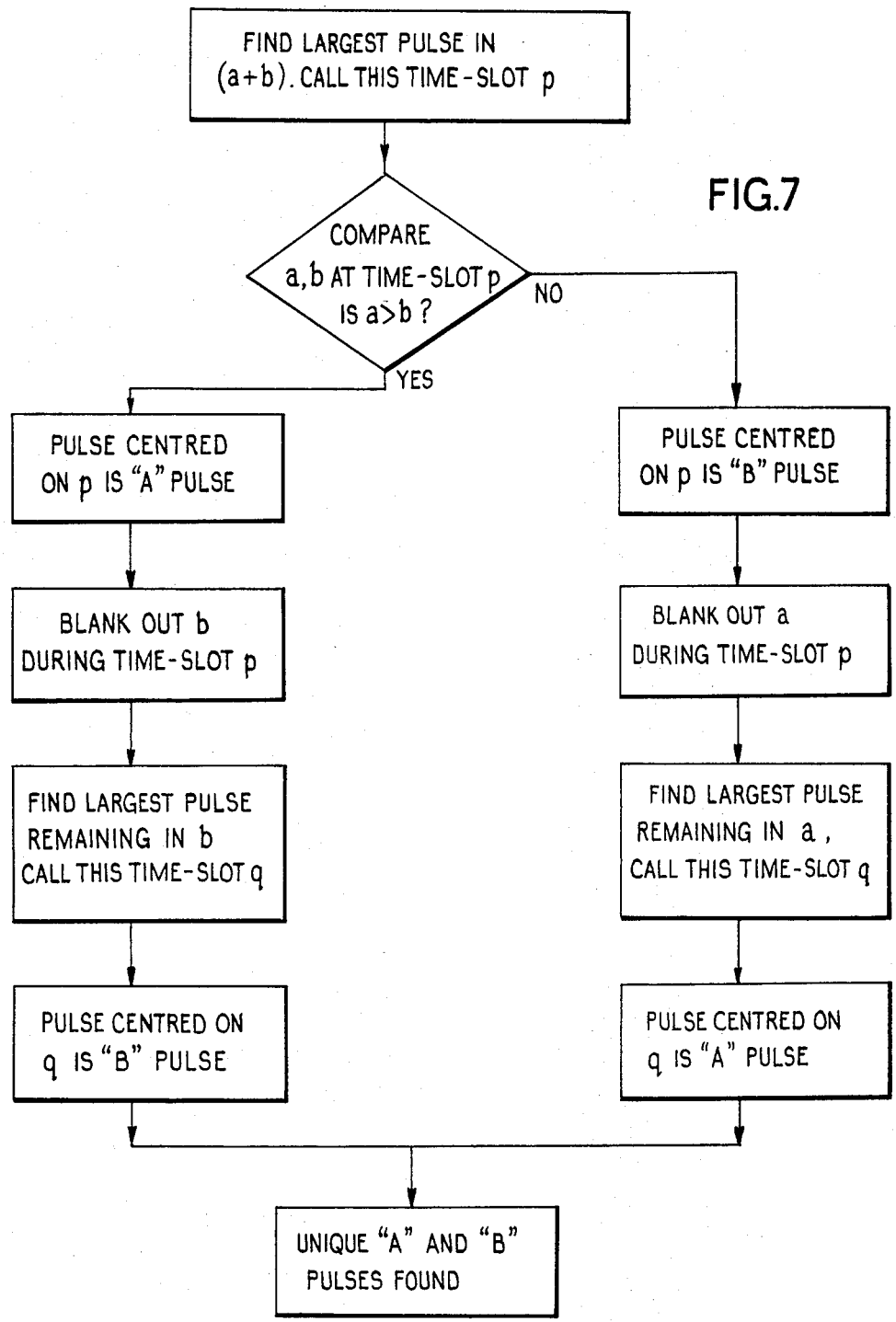
FIG. 7 is a flow chart showing the processing of signals derived from two adjacent detector heads.
Figure 8:
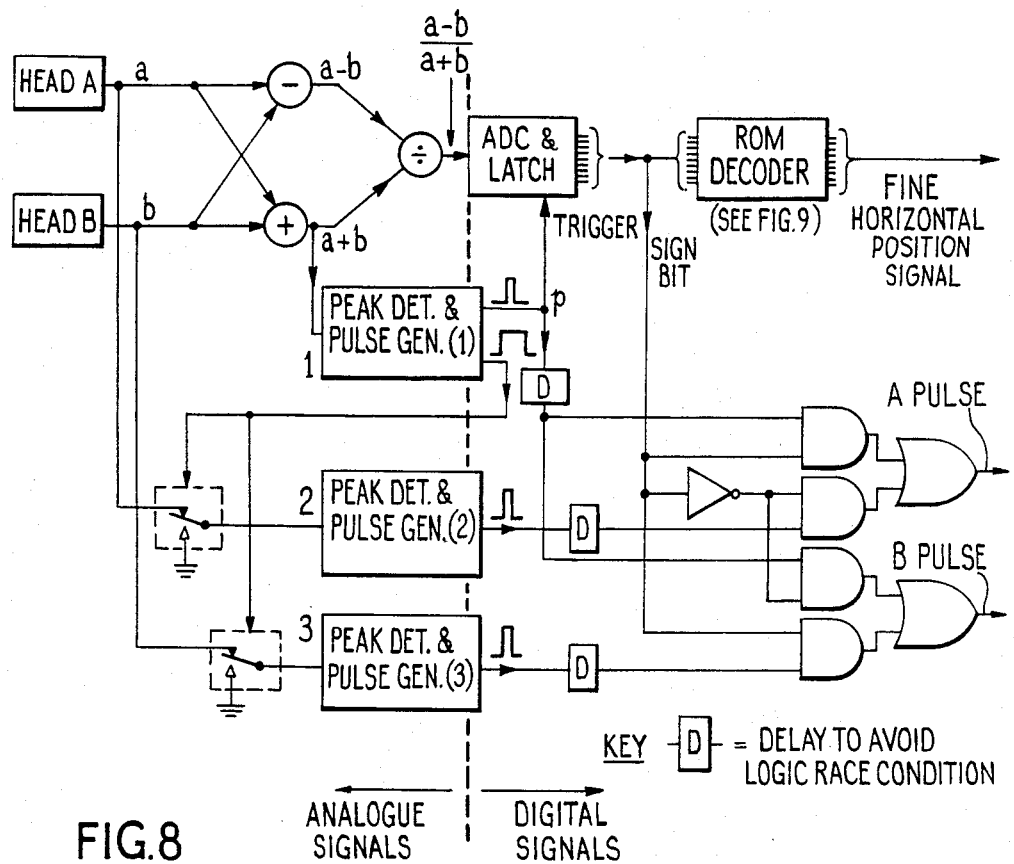
FIG. 8 is a schematic diagram showing apparatus for processing signals from two adjacent detector heads and extracting clean pulses and a fine horizontal position signal.

FIG. 7 shows a flow chart for a processing system which overcomes the problem of centring the scanning heads upon the columns of the hidden pattern. It is possible that the scanning heads straddle adjacent vertical columns of the hidden pattern, and this condition has to be detected and compensated for. The first stage of the operation is to identify the pulse in the correlation signal which is dominant in both heads, as this must represent the column which lies between them. In the lower half of FIG. 4, where a first head "a" straddles columns 0 and 1, and a second head "b" straddles columns 1 and 2, the dominant pulse occurs in Row No. 2. This is located by picking out the peak pulse from a signal formed by the sum of the two head signals a and b. If the two heads are centred upon their respective columns, there will of course be two large pulses in the summed output, one coming from each head, and in this case the decision as to which of these is larger is arbitrary. The flow chart is, however, so arranged that an identical output is obtained in this case irrespective of which decision is made. The process of FIG. 7 derives unique "A" and "B" pulses corresponding to two adjacent columns. In the example given above for columns 0, 1 and 2 of FIG. 4, the largest pulse in the combined signal a+b occurs in time-slot $p=2$; the pulse centred on p is allocated as the B pulse, and the largest pulse remaining in a which occurs at time-slot $q=0$ is allocated as the A pulse; the A pulse occurs at Row 0 and the B pulse occurs at Row 2, which is the result which would have been obtained had the sensors been placed exactly over columns 0 and 1. Apparatus for carrying out the process of FIG. 7 is shown schematically in FIG. 8. Detecting heads A and B provide signals a and b which are used to derive a fine horizontal division signal and two clean A and B pulses for further processing. Each of the peak detectors 1, 2 and 3 in FIG. 8 is required to operate in conjunction with an automatic gain control system, and also with a timing control system which enables the detector during the period when one repeat of the pattern is passing under the web, possibly several times during each press revolution. During the passage of one repeat of the pattern, a peak detector identifies the maximum value of the signal encountered, and outputs a narrow pulse at the instant of the peak. Peak detector 1 is also required to output a wider pulse for blanking purposes, which straddles the narrow pulse in time. The narrow pulse is used to identify the instant when peak correlation occurs, while the wide pulse from pulse generator 1 is used to blank out the corresponding instant in the signals fed to the peak detectors 2 and 3, so that they respond only to the largest pulse remaining. The final output from this processing system is two clean, narrow pulses, an A pulse and a B pulse, representing the peak correlation instant from the columns which are most nearly centred under the two heads.

Figure 9:
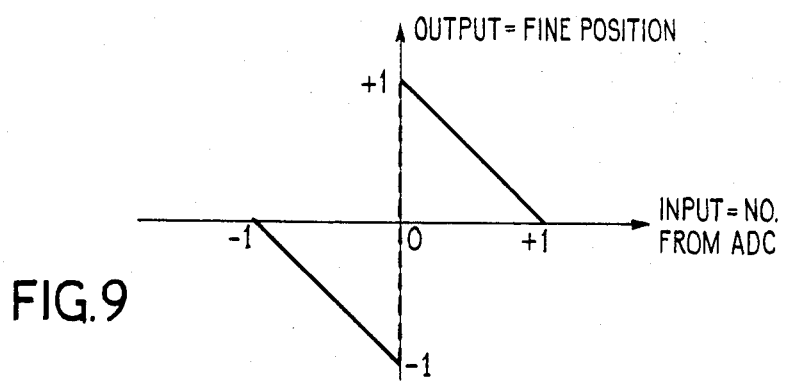
FIG. 9 shows the content of a ROM decoder for deriving the fine horizontal position.

Fine horizontal division detection, i.e. the measurement of the degree of coincidence or otherwise of the scanning head, with particular columns of the pattern, is achieved by measuring the relative amplitudes of the pulses produced in the two heads by that column which lies between them. To ensure a constant scale factor, the output is normalised and is expressed therefore as the term $(A-B)/(A+B)$. This term is digitised and output via a ROM decoder which contains the function shown in FIG. 9. The output which is a fine adjustment to the position is expressed in FIG. 9 as a function of an output signal from an analogue to digital converter (ADC) varying between $-1$ and $+1$. The output is 0 if the scanning heads are aligned with columns of the pattern. If the two scanning heads are centrally disposed over a single column of the pattern, then their outputs are equal, and the output from the decoder of FIG. 9 is either +1 or −1, depending on the decision of logic as to which signal is greater. There is no ambiguity in this latter case, since in the case of the two heads being exactly symmetrical between columns, the changeover point of the fine position signal between −1 and +1 is the same as the changeover point in the identification of an A pulse and B pulse as belonging, for example, to columns 2 and 3 or to columns 3 and 4.

Figure 10:
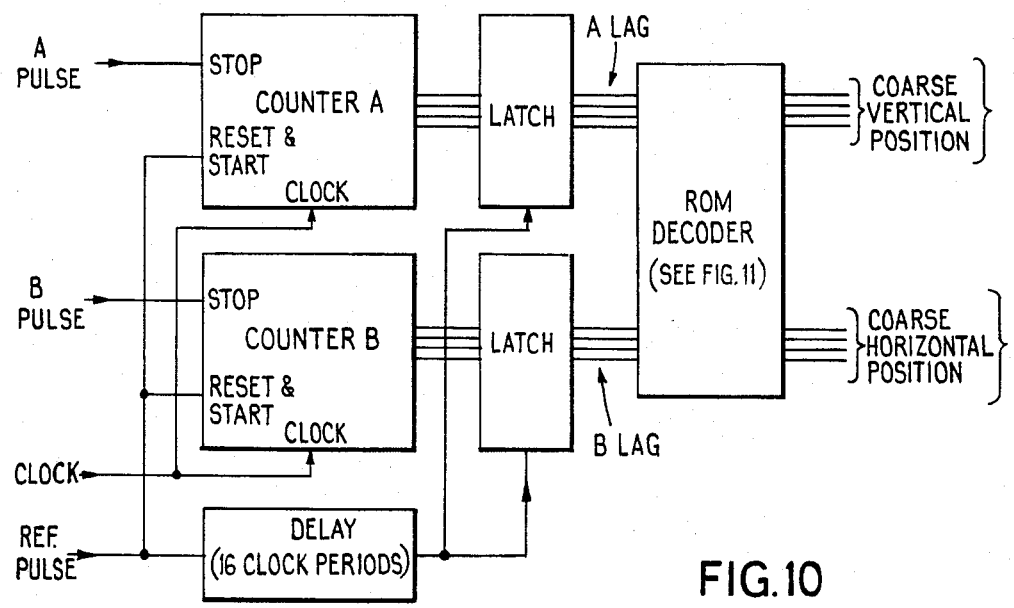
FIG. 10 is a schematic diagram for processing picture signals from two heads and extracting signals representing the coarse vertical and horizontal positions (without fine vertical position)

The clean A and B pulses produced by the system of FIG. 8 are fed into a further processing system such as is shown in FIG. 10. This system is responsible for deriving signals representing the coarse vertical and horizontal positional displacements of the pattern on the web relative to the detectors. The system of FIG. 10 also receives clock pulses, one for each new row of the pattern, and reference pulses, one pulse for each press revolution.

A counting sequence is started once per revolution by a reference pulse which occurs at the start of the period during which the pattern can be detected. This pulse resets and starts the two counters A and B. The counters now count at a rate of 1 count for the passage of each pattern element under the head, under the control of a clock signal generated from the press rotation. The A and B pulses produced by the previous processing are applied to the respective counters to stop the count, so that the number now held in each counter represents the number of pulses or pattern elements occurring between the reference pulse and the peak correlation instant defined by the A or B pulse.

At the end of the period during which counting may occur, the contents of the counters are transferred into latch circuits by a transfer pulse produced by appropriately delaying the reference pulse or by other convenient means. The latches therefore hold a repeatedly updated version of the two counts. The numbers in question are defined in FIG. 10 as A lag and B lag respectively.

A lag and B lag are now applied as addresses to a ROM decoder. The content of the ROM is shown in FIG. 11. The entries in this table are derived from the correlation output of the chosen pattern as shown in the upper half of FIG. 4 in the following manner.

Suppose the two heads to be scanning columns 0 and 1 of the pattern, and suppose the correlation pulse from head A occurs immediately after the reference pulse, so that the counts generated are "A lag=0, B lag=2". The only way in which this combination of outputs can be produced is for the heads to be over columns 0 and 1 and for the pattern to occur when the heads are over rows 0. So in FIG. 11, for A lag 0, B lag 2, are entered the positions of the top of head A as row 0, column 0. A similar argument applies for all other positions of the pair of heads with respect to the pattern, and thus all the entries shown in FIG. 11 can be obtained. In FIG. 11, each vertical pair of figures gives the position of the top of head "A" relative to the pattern. Upper figure=row number, lower figure=column number; e.g. if A lag=8, B lag=2, then top of head "A" is at row 7, column 6.

It will be noted in FIG. 11 that many entries in the table are blank. These correspond to relative stagger between the pattern columns of values which were not selected when analysing FIG. 2. If values of A lag and B lag occur which correspond to a vacant position in the table, this indicates an error has occurred, and appropriate arrangements, such as retaining the last previous correct value, can be made to minimise any resulting malfunction. If a pattern with a larger repeat is chosen, it is possible to arrange the pattern such that every entry in the resulting ROM is surrounded by at least one vacant address in all directions. This permits an error correcting system to be employed, where each incorrect combination of A lag and B lag is assumed to be a corruption of the next nearest allowable entry, and is corrected accordingly.

The two numbers output from the ROM of FIG. 10 thus at all times represent the last available data on the position of the pattern relative to the heads and the reference pulse, measured in integral units of one column and one row of the pattern. There is of course an ambiguity of one pattern repeat in this information, and this must be overcome by a suitable choice of pattern size and pre-registration of the press so that the maximum error to be corrected is always less than half the ambiguity.

If the position of the pattern relative to the heads is not an exact number of elements in the horizontal direction, the fine horizontal position signal as previously described will provide fine position information. Extraction of fine vertical information is discussed in the next section below.

In the foregoing description it has been tacitly assumed that A pulse and B pulse will occur at nominal positions lying in between clock pulses, so that there is no ambiguity in the point at which the A and B counters of FIG. 10 are stopped. In practice this wall not be so as the position of the pattern of the web relative to the clock pulse may shift by an arbitrary amount. A further refinement is therefore necessary to avoid miscounts when one or other of the pulses comes close in time to the clock pulse, and also to extract fine vertical position information to enable interpolation between horizontal rows of the pattern.

This may be done by an extension of the system in FIG. 10. Three changes are necessary.

(a) The clock pulse train at the rate of 1 pulse for the passage of each row of the pattern is replaced by a high frequency clock pulse train by suitable frequency multiplication or other device. Any ratio may be employed, depending upon the fineness of vertical position required. In the following discussion a multiple of 8 times will be assumed.

(b) The A and B counters and latches are correspondingly extended to accommodate the increased count due to the increased clock pulse frequency. In the example the required counting capacity rises from 16, i.e. 4 bits, to 16×8, i.e. 7 bits. The new count will be regarded as a count of 16 units in increments of $\frac{1}{8}$, so that one unit represents a vertical movement of one row of the pattern.

Figures 12A, 12B:
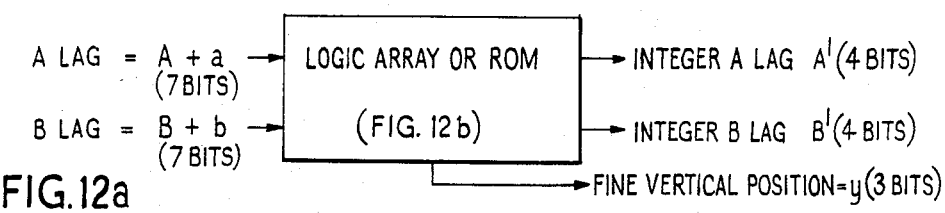

(c) A new processing stage, represented in FIG. 12a, is inserted between the latches and the ROM decoder.

The new processing unit is shown in FIG. 12a. It receives an input A lag and B lag, each of 7 bits, which will be represented as A+a (integral plus fractional part) and B+b similarly. The logic function to be carried out is shown by the table of FIG. 12b. The main output signals are obtained by rounding the input signals A, B either downwards or upwards to give the integral outputs A', B' each of 4 bits. In addition a fine output signal y is generated. This represents the displacement of the mean positions of A lag and B lag from the reference position defined by a count of 0, 8, 16 etc., expressed in sixteenths of a pattern row. The table is constructed by taking for every possible combination of a, b input, the most probable means value, and rounding the main outputs accordingly. Note that when the two inputs are spaced apart by exactly one-half of a row, it is impossible to tell what integral value should be assigned to the spacing between these pulses. This is the condition marked with crosses in the table, for which no useful output is possible. Arrangements should be made in such cases to retain the previous value or give an error warning.

Figure 13:
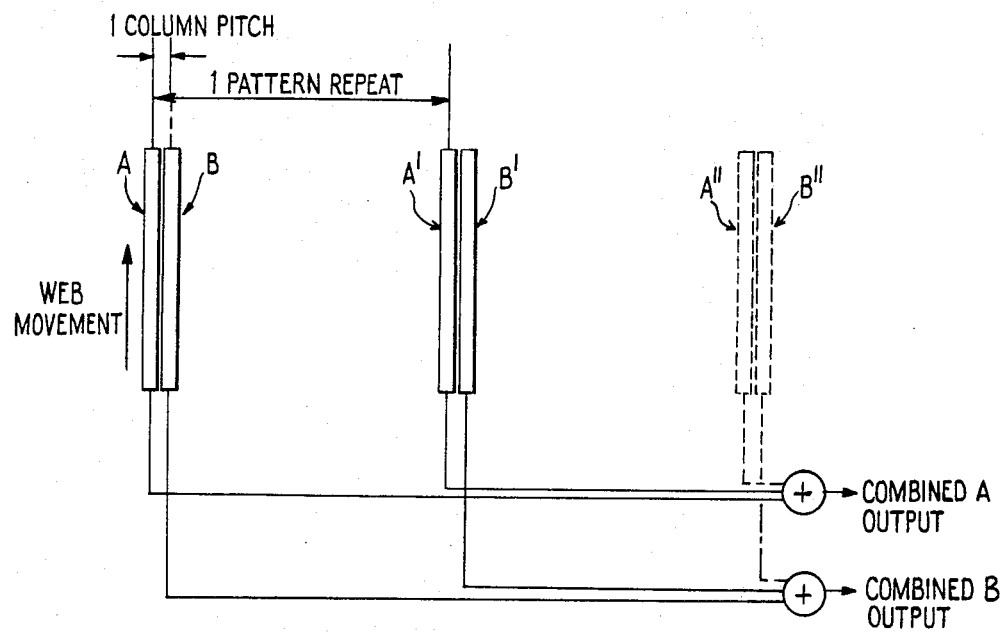
FIG. 13 is a schematic diagram illustrating the use of two or more detector heads arranged across the web in order to improve the signal to noise ratio.

In the foregoing it has been assumed that only two sensing heads, A and B, located upon adjacent columns of the pattern, are used. Adequate performance depends upon the size of pattern and sensing head selected, and upon the intensity of the pattern which is superimposed upon the printed picture; for high quality work a lesser amplitude of pattern will be tolerated. The performance also depends upon the presence of a suitable area of picture in the path scanned by the heads, and the signal-to-noise ratio and thus the performance is improved by extending the area sensed by the heads. Several pairs of heads may be placed side by side spaced at integral multiples of a pattern repeat as shown in FIG. 13. Since the outputs of these are in phase, the simplest method of combining them is by simple addition as shown in FIG. 13.

A greater improvement in signal-to-noise ratio may be effected by more sophisticated signal processing, for instance by comparing the correlation pulse outputs from the various heads and selecting for summation only those which show a sufficient amplitude. A further extension of this principle, as described above, is to control the switching so that only those heads which are scanning an area of picture with a suitable density range (e.g. 10% to 90%) are selected to contribute to the output.

Figure 14:
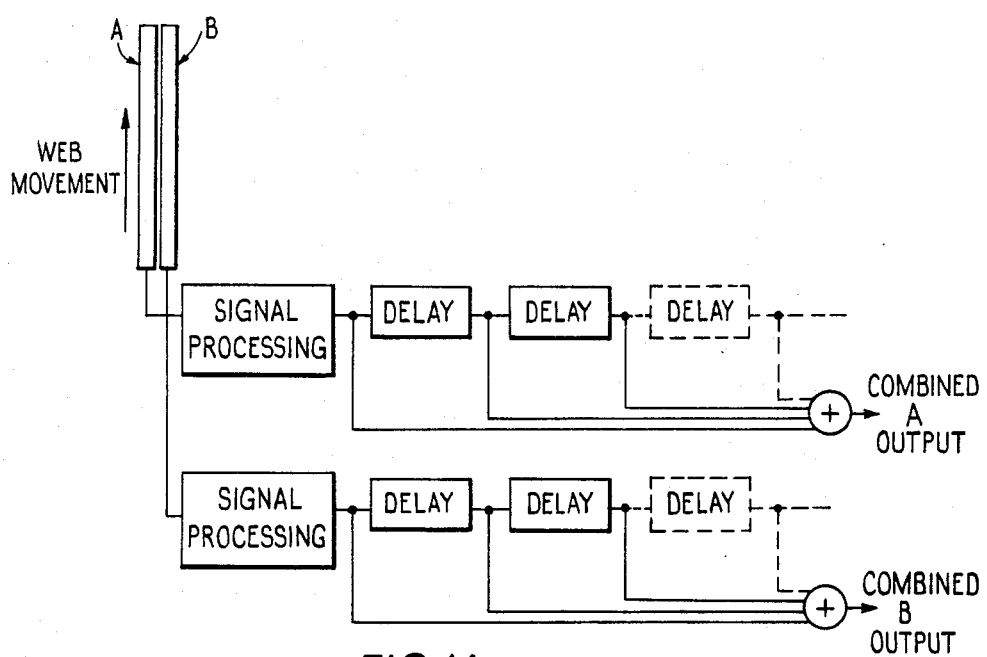
FIG. 14 illustrates the use of nonrecursive delays to improve the signal to noise ratio by extending the sensing along the length of the web.

The sensing area can be extended along the length of the web without the employment of further heads, simply by storing the output from each head during the passage of one vertical repeat of the pattern, and summing these outputs in a suitable way. FIG. 14 shows a straightforward method in which one or more delays each of one pattern repeat are employed. Each of these delays is required to store one complete repeat of the head output, and is preferably a digital shift register.

Figure 15:
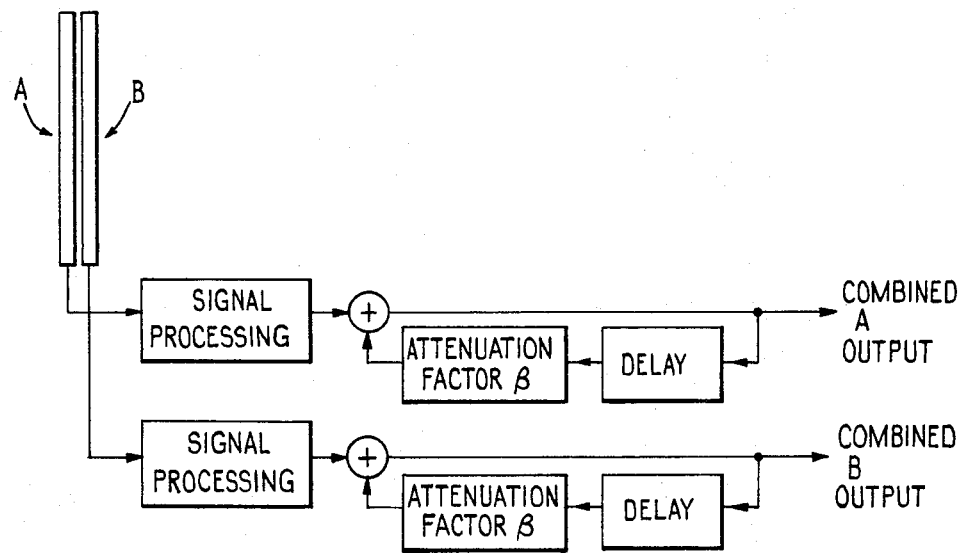
FIG. 15 shows the use of recursive delays for the same purpose as is shown in FIG. 14.

FIG. 15 shows an alternative configuration requiring only a single pattern repeat delay but rather more computation. This is a recursive system which on each pattern repeat gives out the signal generated during that passage of the pattern plus an attenuated version of that produced on the previous passage. Adjustment of the attenuation controls the weight given to previous passages of the pattern.

The above methods may of course be combined to give a two-dimensional extension of the sensed area.

The sum signals used above may further be used during the press run to monitor changes in ink value and effect manual or automatic correction. Although the nominal value of these signals at a particular point is unknown at the start of a press run, once the press is running satisfactorily the values should be constant, and therefore provided the values at a point in a suitable picture are gated out, these may be taken as an indication of variation of the press.

An optical head sensing 16 pattern elements simultaneously has been described. It is of course possible to replace this by a single element sensing head and a suitable digital electronic system which adds or subtracts the values at 16 successive instants in accordance with the pattern expected, and presents an output equivalent to the difference output of the optical head.

Any of the embodiments of the invention described above may be used to control the register and alignment of colour printing operations. In gravure printing with four printing colours, there will preferably be three detector heads, one over each of the second, third and fourth printing stations. The first detector then has to distinguish between two printed colours to monitor their register and alignment; the second detector sees three printed colours; and the third detector sees all four printed colours. Suitable filtering processes, as described above, can separate the coloured patterns. In offset litho printing, however, there need only be one detector head, with suitable filters, for controlling the register and alignment of all four printing operations.

I claim:

1. A method of controlling the register of a printing operation with at least another operation performed on a web at respective stations, comprising the steps of: providing picture signals corresponding to an image to be reproduced on which is superimposed a hidden, irregular pattern (REPEAT CELL, FIG. 1) which is repeated many times over the image area; printing the web from a printing member produced under the control of the picture signal; monitoring (A, B; FIG. 13) the relative positions of the printed image on the web and the other operation performed on the web by detecting light derived from a portion (P, FIG. 1) of the printed image on the web surface, and correlating (FIGS. 1A, 2) the variations of light intensity within that portion with the variations of regions of the predetermined pattern, and thus deriving a position signal indicative of the displacement of the web from a reference position established by the position of the detector; and maintaining the correct register of the operations by making adjustments at a station in accordance with the position signal.

2. A method of controlling the register of colour printing operations performed on a web at printing stations, comprising the steps of: providing picture signals corresponding to each colour component to be printed, each colour component comprising a colour separation of a coloured image to be reproduced having superimposed thereon a hidden, irregular pattern (REPEAT CELL, FIG. 1) which is repeated many times over the image area; printing the web at each printing station from a printing member produced under the control of the corresponding picture signal; monitoring (A, B, FIG. 13) the relative positions of each printed image on the web by detecting light derived from a portion (P) of each colour separation on the web surface, and correlating (FIGS. 1A, 2) the variations of light intensity within that portion with the variations of regions of the predetermined pattern, and thus deriving a position signal indicative of the displacement of the web from a reference position established by the position of the detector; and maintaining the correct register of the printing operations by making adjustment at printing stations in accordance with the position signals.

3. A method according to claim 2 for register control for half-tone colour printing, wherein the said irregular pattern is sensed for a given colour only in regions of the original image where the half-tone dot size for that colour is greater than about 10% and less than about 90%.

4. Apparatus for controlling the register of a printing operation with at least another operation performed on a web at respective stations, the printing operation comprising printing an image on the web from a printing member produced under the control of a picture signal corresponding to a picture to be reproduced on which is superimposed a hidden, irregular pattern (REPEAT CELL, FIG. 1) which is repeated many times over the image area, comprising: a detector arranged to detect the pattern on the printed image, each detector comprising optical fibre means arranged to conduct light to a single photodetector, the output of the photodetector varying in time in accordance with a column of the superimposed pattern; means for storing the timewise variations of the photodetector output; and means for processing the stored photodetector output in accordance with a stored original, predetermined pattern, in order to produce a correlation signal; and register correction means responsive to the correlation signal to correct the register of the operations by making adjustments at a corresponding station in accordance with a position signal derived from the correlation signal.

5. Apparatus for controlling the register of a printing operation with at least another operation performed on a web at respective stations, the printing operation comprising: printing an image on the web from a printing member produced under the control of a picture signal corresponding to a picture to be reproduced on which is superimposed a hidden, irregular pattern (REPEAT CELL, FIG. 1) which is repeated many times over the image area, comprising: a detector arranged to detect the patterns on the printed image, each detector comprising an optical fibre array, the array being divided into two groups (x,y, FIG. 5a) whose members are arranged in a predetermined pattern, the detector further comprising two photodetectors (R, R') each arranged to receive light from all the optical fibres from a group, the output of the photodetectors varying in time in accordance with a column of the superimposed pattern; means for storing the timewise variations of the photodetector outputs; means for processing the stored photodetector outputs in accordance with a stored original, predetermined pattern to produce a correlation signal; and means for maintaining the correct register of the operations by making adjustments at a corresponding station in accordance with a position signal derived from the correlation signal.

6. Apparatus in accordance with claim 5, wherein the outputs from the two photodetectors of each detector are subtracted by the processing means to produce the correlation signal in which a peak occurs when light from the web entering each of a first group of optical fibres is of predominantly lower intensity than light entering each of a second group of optical fibres.

* * * * *